April 8, 1941.  J. P. CASTELLANO  2,237,547
DUAL WHEEL VEHICLE
Filed July 2, 1938  2 Sheets-Sheet 1

INVENTOR
J. P. Castellano
BY
Morgan Finnegan Durham
ATTORNEY

Patented Apr. 8, 1941

2,237,547

UNITED STATES PATENT OFFICE 2,237,547

DUAL WHEEL VEHICLE

Joseph P. Castellano, Brooklyn, N. Y., assignor to Differential Wheel Corporation, New York, N. Y., a corporation of Delaware Application July 2, 1938, Serial No. 217,186

3 Claims. (Cl. 180—22)

The invention relates to new and useful improvements in dual vehicular wheel assemblies, and more particularly to novel and useful improvements in driving and braking mechanisms in such assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
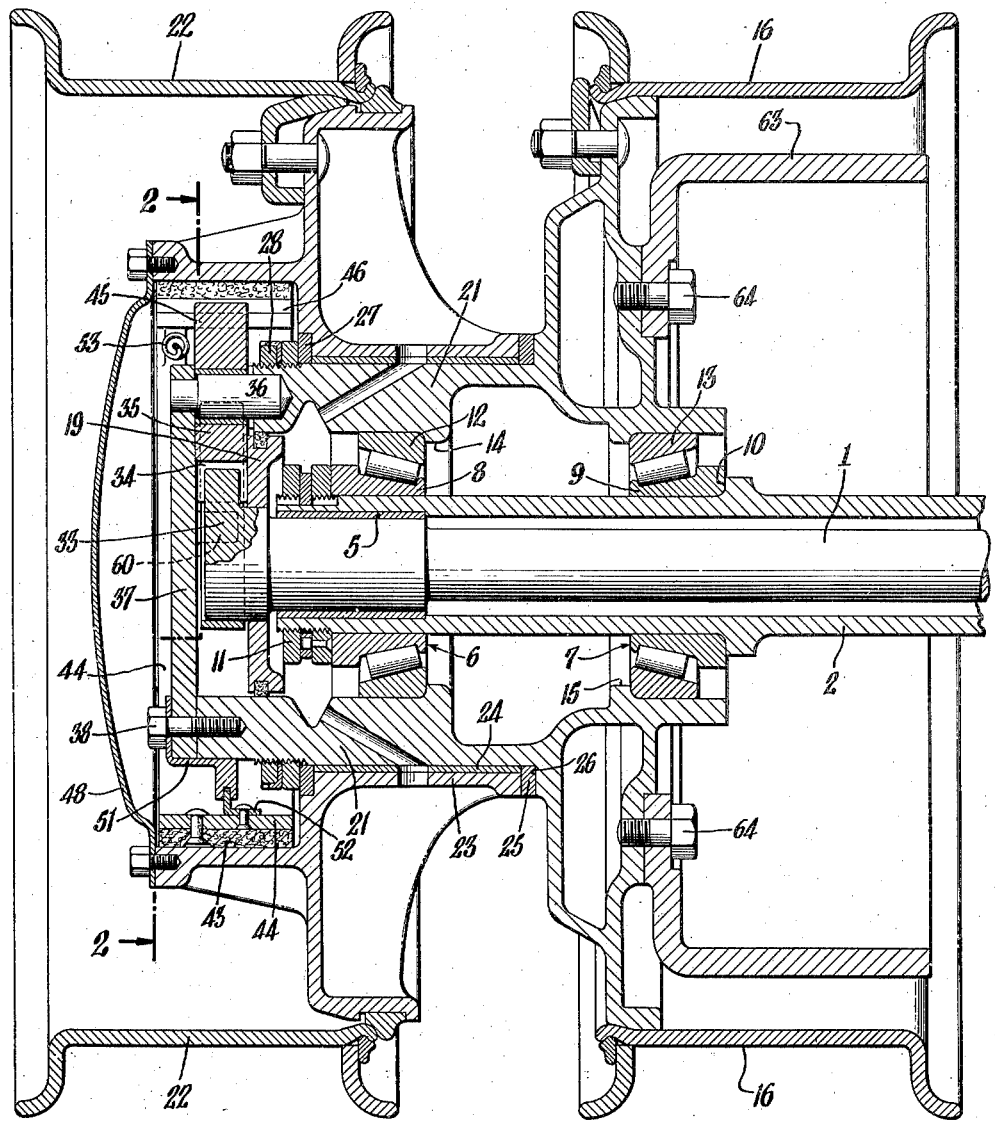
Figure 2:
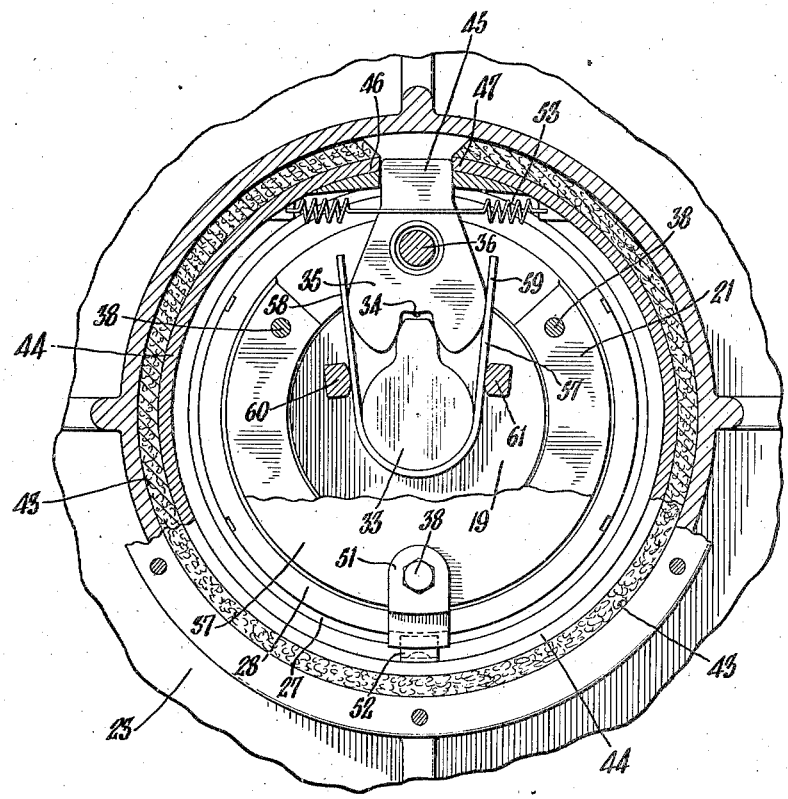

Of the drawings:

Fig. 1 is a longitudinal section through a mechanism embodying the invention; and Fig. 2 is a vertical section on line 2—2 of Fig. 1.

Objects of the invention are to provide a novel and useful driving or traction dual wheel mechanism wherein both wheels are locked together when the motor is driving or exerting tractive effort and also when the brakes are applied, but the side by side wheels are permitted to rotate independently whenever there is no drive from the motor and the brakes are off. Thus the driving tractive effort and the retardant tractive action of the brakes are distributed to both tires, and at other times the free rotation of both wheels minimizes the wear on the tires. A further object is to provide simple and sturdy mechanism for effecting the purposes stated which is simple and economical to manufacture and assemble, and is well able to withstand the strains and loads of active commercial service.

With these and other objects in view a traction-exerting dual wheel assembly is provided wherein a driving axle shaft is connected to positively drive one of said wheels, which wheel is also provided with a brake mechanism, and there is a clutch mechanism between the two wheels, which is actuated to connect the driven and non-driven wheels when the axle is driving, and also when the brake is applied, and is actuated to disconnect the two wheels at other times so that they will rotate independently of each other. More in detail, the driving axle has an angularly projecting arm which engages and actuates a clutch-controlling arm mounted on the hub of the driven (inboard) wheel, and connected so that the wheel is positively driven by the shaft. Said clutch controlling arm is pivotally mounted on the wheel hub to have limited angular movement in both directions, these movements operating the clutch mechanism between the two wheels, the arm being spring impelled toward the non-clutching position. The clutch mechanism is of the expanding shoe type, and comprises a drum mounted on the hub of the non-driven wheel and within the drum an annular shoe which is expanded to clutch the drum by movement of the aforesaid angularly-movable arm. The arm is moved in one direction to actuate the clutch by the drive on the axle, and is moved in the opposite direction to actuate the clutch by the retardation of the wheel brake mechanism, and the arm is returned by its spring to non-clutching position whenever there is no drive on the shaft and the brake is off. It will be understood that the foregoing general description and the following detail description as well are explanatory and exemplary but are not restrictive of the invention.

Referring now in detail to the embodiment of the invention illustrated by way of example in the accompanying drawings, a driving axle shaft 1 is mounted in an axle housing 2. The shaft is driven by any suitable means, such as a differential drive (not shown) and its outer end is journaled in a sleeve 5 mounted in the outer end of the housing 2. Mounted on the housing 2 are combined radial and thrust anti-friction bearings 6 and 7. The inner raceways 8 and 9, respectively, are mounted on the housing 2, the raceway 9 abutting on an annular shoulder 10 formed on the housing, and raceway 8 being held in position by a lock nut 11 screw-threaded on to the outer end of the housing 2. The outer raceways 12 and 13, respectively, abut on annular rings 14 and 15 formed on the hollow interior of the hub of the inboard wheel 16.

Wheel 16 has a large outwardly extending hub 21, and the outboard wheel 22 has a hub 23 mounted exteriorly on the hub 21 of the inboard wheel, with a sleeve 24 interposed. At the inner end of the sleeve 24 is a flat friction ring 25, abutting on a shoulder 26 formed on the outer face of the inboard wheel 16, and at the outer end of sleeve 24 is a friction ring 27, held in place by a lock nut 28, screw-threaded onto the hub 21 of the inboard wheel 16. An oil seal 19 is provided near the end of the hub opening.

In the embodied form, means are provided whereby the inboard wheel 16 is continuously in driving connection with the axle 1, and the outboard wheel is clutched to and declutched from the inboard wheel, being clutched when the motor is driving or the vehicle brake is applied, and being declutched when the brake is off. In said embodied form, the outer end of axle 1 projects beyond the end of housing 2 and integral with or fixed to the axle end is a short arm 33, which always turns with the axle. The outer end of the arm 33 projects into a Y-shaped recess 34, formed in the inner end of a clutch-controlling lever 35. The lever 35 is pivoted on a stub shaft 36, mounted on the face of the hub 21 of the inboard wheel 16, the outer end of stub shaft 36 being mounted in a cover plate 37, which covers the recessed outer face of the hub 21, and is fixed thereto by bolts 38. Formed on the outer face of the outboard wheel 22 is a drum 43, and mounted within the drum is a cleft or interrupted annular frictional clutching shoe 44, which is expansible to clutch the drum 43 and contractable to release it. The shoe 44 is actuated and controlled by the outer end 45 of lever 35, which projects into and substantially fills the opening between the two ends 46 and 47 of the annular clutching shoe 43. A cover plate 48 closes the end of drum 43. Suitable braking means are provided, and as embodied, a brake drum 63 is fixed on the inner face of inboard wheel 16 by means of bolts 64. Suitable brake shoes (not shown) and actuating means therefor will be provided, which may be of any known or convenient form.

The parts are constructed, disposed and proportioned so that when lever 35 is in a substantially straight or radial position the shoe 44 is contracted and free of the drum 43, and the outboard wheel is free to rotate independently of the inboard wheel, but when lever 35 is rocked slightly in either direction, clutch shoe 44 is expanded and engages the drum 43, and thereby clutches the two wheels so that they rotate together. The shoe 44 is engaged substantially centrally of its circumference by a holding bracket 51, having a foot 52 pressing the shoe at its central point firmly against the drum 43, the bracket 51 being mounted at 52 on the plate 37 which is fixed to the face 21 of the inboard wheel. The ends of the shoe 44 are resiliently drawn toward the declutched position by a tension coil spring 53. Resilient means are provided for normally impelling the lever 35 towards the straight or radial and declutching position. As embodied, a U-spring 57 is mounted about the curved end of the arm 33 and its leaves 58 and 59 press at either side upon curved surfaces formed on either side of the inner end of lever 35. The leaves of spring 57 are held in resilient engagement with the lever 35 by means of stops 60 and 61, which may be adjustable, mounted on the hub 21.

The inner wheel 16 is driven from the shaft 1 by means of the arm 33, the toothed end of which engages in recess 34 in lever 35, this lever being restrained against extreme movement. Lever 35 is pivoted on pin 36 which projects from hub 21 of the wheel 16 so that the driving force is transmitted directly to the wheel.

Thus when shaft 1 is being driven, arm 33 rotates lever 35 a very little, and thus expands shoe 44 which immediately engages drum 43, thereby stopping further relative movement of arm 33 and lever 35 and clutching the two wheels together. This condition remains as long as the motor continues to exert torque on the wheels. On cessation of the torque, spring 53 contracts shoe 44, and declutches the outboard wheel, leaving the wheels free for independent rotation, and at the same time the arm 33 and lever 35 move back to their substantially radial position. If the brake be applied to the inboard wheel 16, the stub shaft 36 will be moved relative to arm 33, but in the opposite direction, due to the retardant action of the brake, and lever 35 will be thereby rocked slightly and will cause the shoe 44 to engage the drum 43, thereby locking the wheels together as previously described. They will continue thus locked together during the continuance of the braking action, but as soon as the brake is released the parts, under the action of spring 53, will return to the declutched position as before described.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicular dual wheel assembly including in combination a driving axle shaft, an inboard wheel journalled on the housing, and having an outwardly projecting hub, an outboard wheel journalled on the hub of the inboard wheel, a brake drum fixed to the inboard wheel, a drum fixed to the outboard wheel, an expansible and contractable clutching shoe within said drum, a lever pivotally mounted on the hub of the inboard wheel and adapted to move the shoe into clutching position by movement in either direction, spring means impelling the shoe and lever to non-clutching position, and an arm fixed to said axle shaft and connected to rock the lever, whereby the wheels are connected to rotate together when the axle is driving or the brake is applied and are disconnected to rotate freely at other times.

2. A vehicular dual wheel assembly including in combination a driving shaft, two wheels mounted on the shaft and capable of independent rotation, connections from the shaft for positively driving one of said wheels, a brake mechanism, a member moved by application of the brake with the vehicle in motion and means actuated by said member for connecting the driven wheel and the other wheel when the brake is applied.

3. A vehicular dual wheel assembly including in combination a driving shaft, two side by side wheels mounted for independent relative rotation thereon, a normally released clutch for preventing relative rotation of the wheels, a yielding connection between one of the wheels and the shaft and means interconnecting the clutch and yielding connection for actuating the clutch.

JOSEPH P. CASTELLANO.